(12) United States Patent
Ryu

(10) Patent No.: US 11,553,806 B2
(45) Date of Patent: Jan. 17, 2023

(54) WINE STORAGE APPARATUS

(71) Applicant: Samsung Electronics Co., Ltd., Suwon-si (KR)

(72) Inventor: Dongnyeol Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 16/730,233

(22) Filed: Dec. 30, 2019

(65) Prior Publication Data

US 2020/0214474 A1 Jul. 9, 2020

(30) Foreign Application Priority Data

Jan. 3, 2019 (KR) .................. 10-2019-0000515

(51) Int. Cl.
| | | |
|---|---|---|
| A47F 3/04 | (2006.01) | |
| G06F 16/50 | (2019.01) | |
| A47F 7/28 | (2006.01) | |
| G06F 3/04886 | (2022.01) | |
| G07F 9/10 | (2006.01) | |
| G07C 9/00 | (2020.01) | |
| G07C 9/32 | (2020.01) | |
| F25D 25/02 | (2006.01) | |
| A47B 73/00 | (2006.01) | |

(52) U.S. Cl.
CPC .............. *A47F 3/043* (2013.01); *A47F 7/28* (2013.01); *F25D 25/02* (2013.01); *G06F 3/04886* (2013.01); *G06F 16/50* (2019.01); *G07C 9/00912* (2013.01); *G07C 9/32* (2020.01); *G07F 9/105* (2013.01); *A47B 73/00* (2013.01); *F25D 2400/361* (2013.01); *F25D 2700/06* (2013.01); *G06F 2219/00* (2013.01)

(58) Field of Classification Search
None
See application file for complete search history.

(56) References Cited

U.S. PATENT DOCUMENTS

| | | | |
|---|---|---|---|
| 9,144,328 B2* | 9/2015 | Seeley | G06F 3/04886 |
| 10,146,495 B2* | 12/2018 | Nizzoli | G06F 3/1454 |

(Continued)

FOREIGN PATENT DOCUMENTS

| | | |
|---|---|---|
| CN | 203860754 U | 10/2014 |
| KR | 10-2006-0099992 A | 9/2006 |

(Continued)

OTHER PUBLICATIONS

International Search Report dated Apr. 28, 2020, issued in International Application No. PCT/KR2019/018739.

(Continued)

*Primary Examiner* — K. Wong
(74) *Attorney, Agent, or Firm* — Jefferson IP Law, LLP

(57) ABSTRACT

A wine storage apparatus is provided. The wine storage apparatus includes a housing, a door configured to open and close the housing and including a display, a rack provided inside the housing and configured to hold a bottle of wine, a sensor configured to obtain information about whether a bottle of wine is stored on the rack, and a processor configured to identify whether the bottle of wine is stored on the rack based on the information, and control the display to display guide information of the bottle of wine based on an identification result.

19 Claims, 16 Drawing Sheets

(56) References Cited

U.S. PATENT DOCUMENTS

| | | |
|---|---|---|
| 2007/0162357 A1 | 7/2007 | Banerjee et al. |
| 2014/0125599 A1 | 5/2014 | Seeley |
| 2014/0126829 A1 | 5/2014 | Seeley et al. |
| 2014/0324624 A1 | 10/2014 | Ward et al. |
| 2017/0069150 A1 | 3/2017 | Kim et al. |
| 2018/0235392 A1 | 8/2018 | Yuki et al. |

FOREIGN PATENT DOCUMENTS

| | | |
|---|---|---|
| KR | 10-2008-0035093 A | 4/2008 |
| KR | 10-2018-0025041 A | 3/2018 |

OTHER PUBLICATIONS

European Search Report dated May 18, 2020, issued in European Application No. 20150126.9.

\* cited by examiner

WINE STORAGE APPARATUS

CROSS-REFERENCE TO RELATED APPLICATION(S)

This application is based on and claims priority under 35 U.S.C. § 119(a) of a Korean patent application number 10-2019-0000515, filed on Jan. 3, 2019, in the Korean Intellectual Property Office, the disclosure of which is incorporated by reference herein in its entirety.

BACKGROUND

1. Field

The disclosure relates to a wine storage apparatus. More particularly, the disclosure relates to a wine storage apparatus displaying information about wine being stored.

2. Description of the Related Art

To store wine for optimum flavor, it is important to optimize various conditions such as temperature, humidity, illuminance, etc. Therefore, a wine cellar, a wine refrigerator, or the like has been launched as a separate apparatus for storing the wine.

There are different methods of optimally storing the wine according to the kinds of wine. For example, an optimal storage temperature, an optimal storage period, etc. are varied depending on the kinds of wine. Therefore, while wine is stored in the wine cellar, there is a need of checking information about the stored wine and information related to storage of each wine.

However, when the door of the wine cellar is frequently opened to check the wine information or the wine storage information, a problem that the stored wine rapidly ripens may arise as the inner temperature of the wine cellar is changed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above mentioned problems and/or disadvantages and to provide at least the advantages described below. Accordingly, an aspect of the disclosure is to provide a wine storage apparatus that outputs wine information with minimal opening/closing of a door.

Additional aspects will be set forth in part in the description which follows and, in part, will be apparent from the description, or may be learned by practice of the presented embodiments.

In accordance with an aspect of the disclosure, a wine storage apparatus is provided. The wine storage apparatus includes a housing, a door configured to open and shut the housing, a display provided in the door, a rack provided inside the housing and configured to hold a bottle of wine, a sensor configured to obtain information about whether a bottle of wine is stored on the rack, and a processor configured to identify whether the bottle of wine is stored on the rack based on the information obtained by the sensor, and control the display to display guide information about the bottle of wine based on an identification result.

The display may include a touch panel, and the processor may be configured to display the guide information about a bottle of wine on the display, based on a result of identifying whether the bottle of wine is stored on the rack corresponding to a predetermined position as a user touches the predetermined position on the touch panel.

The sensor may be configured to obtain information about whether a bottle of wine is stored on the rack, based on detection of a pressure sensor, an optical sensor or an image sensor.

The processor may be configured to identify weight of a bottle of wine stored on the rack through the sensor comprising a pressure sensor, and identify a remaining amount of the stored wine based on information about the identified weight.

The processor may be configured to identify a liquid level of in the bottle of wine stored on the rack through the sensor comprising an image sensor, and identify a remaining amount of the stored wine based on information about the identified liquid level.

The processor may be configured to change the guide information about the bottle of wine, based on information about a remaining amount in the identified bottle of wine.

The sensor may include an image sensor, and the processor may be configured to identify the bottle of wine based on a wine image captured by the image sensor.

The image sensor may be provided at upper and lower sides or left and right sides in the housing, and the processor may be configured to control the image sensor to capture an image of the bottle of wine, based on detection of the bottle of wine moving toward the rack.

The processor may be configured to switch the image sensor from a sleep mode over to an operation mode, based on detection that the door is opened.

The sensor may be provided corresponding to each of a plurality of wine holders provided in the rack, and the rack may include a wiring line configured to electrically connect the plurality of sensors corresponding to the plurality of wine holders.

The sensor may include a pressure sensor including a wireless communicator.

The housing may include a first storage compartment and a second storage compartment which are isolated from each other, and the door may include a first door including the display and configured to open and shut the first storage compartment, and a second door including a touch panel and configured to open and shut the second storage compartment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
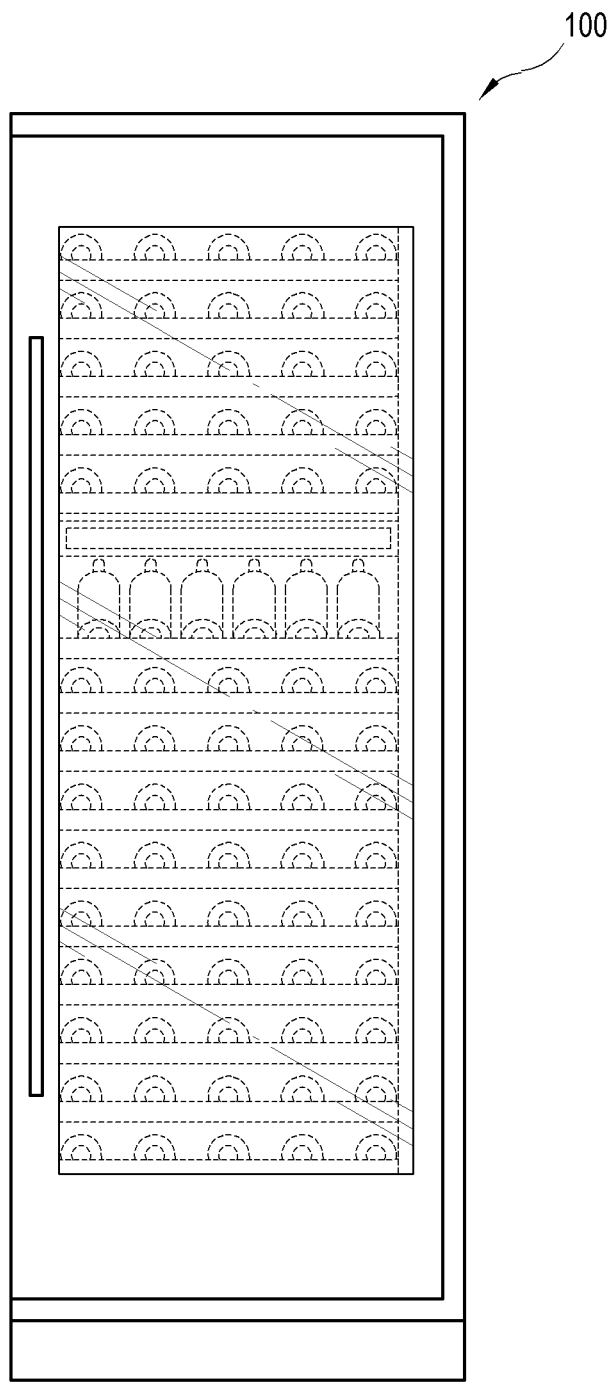
FIG. 1 is a front view of a wine storage apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the inventive concept and the key configurations and functions. The embodiments described with reference to the accompanying drawings are not exclusive to each other unless otherwise specified, and a plurality of embodiments may be selectively combined and realized. In the following descriptions, details about publicly known functions or features will be omitted if it is identified that they cloud the gist of the inventive concept.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. Further, it will be appreciated in the following embodiments that terms 'upper', 'lower', 'left', 'right', 'top', 'bottom', etc. are defined with reference to the accompanying drawings and do not limit the disposition or position of the elements. In addition, a 'module' or a 'portion' may perform at least one function or operation, be achieved by hardware, software or combination of hardware and software, and be modularized into at least one processor. Further, in the following embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 is a front view of a wine storage apparatus according to an embodiment of the disclosure.

Referring to FIG. 1, a wine storage apparatus 100 according to an embodiment of the disclosure may for example be embodied by a wine cellar, a wine refrigerator, or a wine storage. However, the wine storage apparatus 100 according to an embodiment of the disclosure is not limited to these examples, and may include any apparatus capable of storing wine. Further, the wine storage apparatus 100 according to an embodiment of the disclosure may be embodied by a separate independent apparatus, or may be integrated into another apparatus, e.g. a refrigerator.

Figure 2:
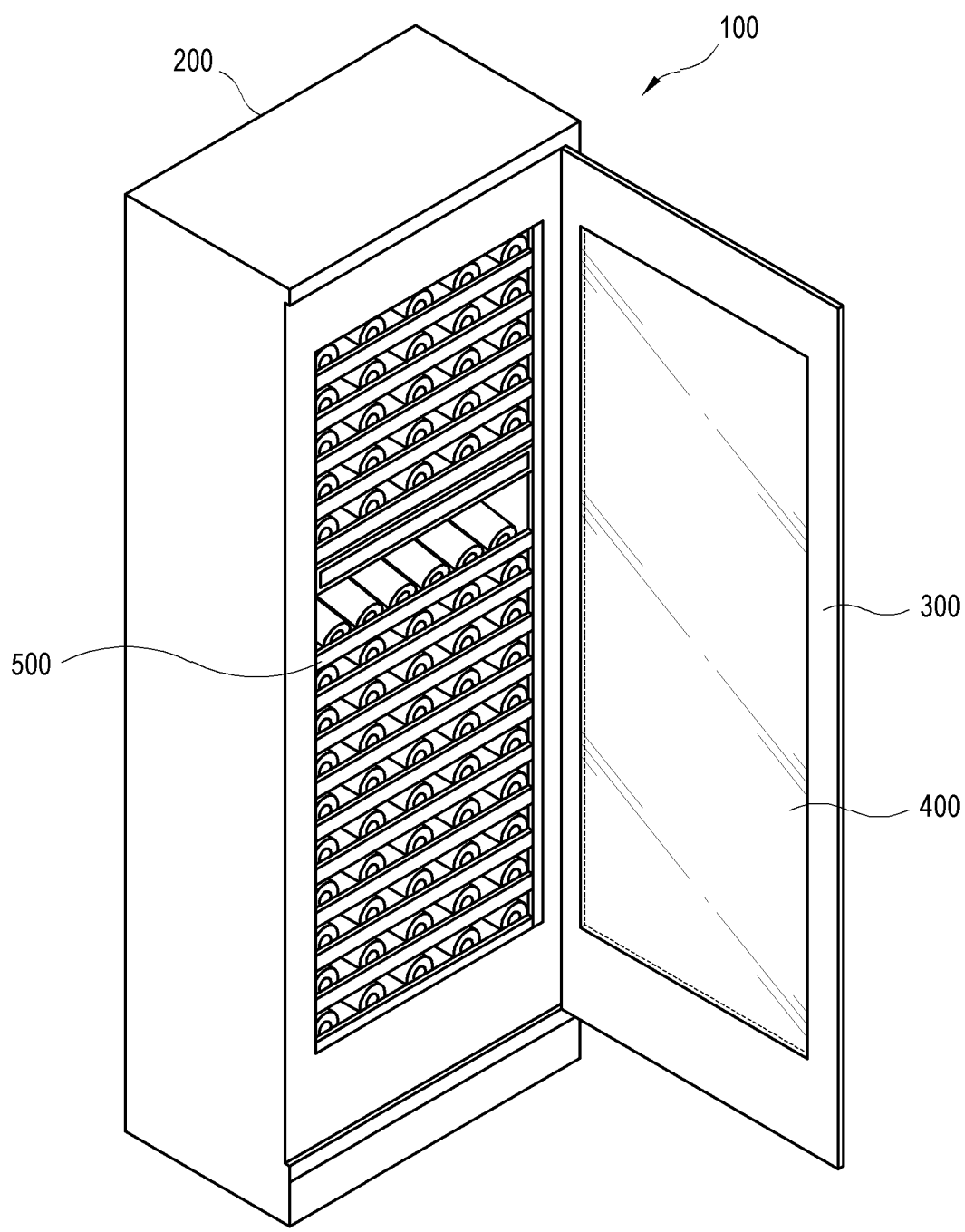
FIG. 2 is a perspective view of a wine storage apparatus according to an embodiment of the disclosure.

FIG. 2 is a perspective view of a wine storage apparatus according to an embodiment of the disclosure.

Referring to FIG. 2, the wine storage apparatus 100 according to an embodiment of the disclosure includes a housing 200, a door 300, a display 400, a rack 500, a sensor 600, and a processor 700.

The housing 200 forms an outer appearance of the wine storage apparatus 100, and includes a storage compartment 210 in which a bottle of wine is stored. The housing 200 insulates wine stored in the storage compartment 210 against external humidity and temperature.

The storage compartment 210 is formed in the housing 200. Inside the storage compartment 210, at least one rack 500 is disposed to partition the storage compartment 210 into a plurality of spaces so that wine can be easily stored.

The door 300 opens and closes the housing 200. The door 300 is provided in the front of the housing 200 and prevents leakage of air circulating inside the storage compartment 210. The door 300 may be made of a transparent material through which the inside of the storage compartment 210 is visible to the naked eyes. Further, the door 300 may be made of ultraviolet proof glass to prevent a bottle of wine stored in the storage compartment 210 from changing in taste and aroma based on exposure sunlight, in particular, ultraviolet light. Further, the door 300 may include a handle so that a user can easily open and shut the door 300.

The display 400 may be provided in the door 300. The display 400 may display an image. The display 400 may be embodied without limitations, for example, may be embodied by various display methods, such as liquid crystal, plasma, a light emitting diode LED, an organic light emitting diode OLED, a surface-conduction electron-emitter, a carbon nano-tube, nano-crystal, etc. In case of the liquid crystal method, the display 400 includes a liquid crystal display (LCD) panel, a backlight unit for supplying light to the LCD panel, a panel driver for driving the LCD panel, etc. Alternatively, the display 400 may be embodied by an OLED panel that can emit light itself without the backlight unit.

The rack 500 is provided in the housing 200. The rack 500 is capable of holding a bottle of wine. The racks 500 may be disposed at certain intervals to partition the inside of the storage compartment 210 into a plurality of spaces. The plurality of spaces may be divided and set with different temperatures, respectively. To more efficiently circulate the air flowing within the storage compartment 210, a plurality of holes may be formed on the rack 500.

The sensor 600 obtains information about whether a bottle of wine is placed on the rack 500, or the like information. Details about the type and operation of sensor 600 will be described later.

The processor 700 identifies whether a bottle of wine is placed on the rack 500 based on information obtained by the sensor 600, and controls a display 400 to display guide information about the wine or whether the bottle of wine is placed based on identification results. In this regard, detailed descriptions will be made later.

The processor 700 may process information or an image to identify where a bottle of wine is placed, identify the wine, etc. There are no specific limits to the information processing or the image processing to be carried out by the processor 700.

The processor 700 may perform control for operating general elements of the wine storage apparatus 100. The processor 700 may execute a control program (or instruction). In this case, the wine storage apparatus 100 may further include a nonvolatile memory in which the control program is installed, and a volatile memory in which at least a part of the installed control program is loaded. Further, the control program may be stored in an electronic apparatus other than the wine storage apparatus 100.

The control program may include a program(s) achieved in the form of at least one of a basic input/output system (BIOS), a device driver, an operating system, firmware, a platform, and an application program. According to one embodiment, the application program may be previously installed or stored in the wine storage apparatus 100 when the wine storage apparatus 100 is manufactured, or may be installed in the wine storage apparatus 100 on the basis of application program data received from the outside when used in the future. The application data may be for example downloaded from an application market and the like external server to the wine storage apparatus 100, but not limited thereto. Meanwhile, the processor 700 may be embodied in the form of a device, a software module, a circuit, a chip, or combination thereof. Below, operation of executing and implementing the control program by the processor 700 according to an embodiment of the disclosure may for convenience be described as operation of the processor 700 without mentioning the control program.

The processor 700 may, for example, control the sensor 600 to obtain information of whether a bottle of wine is put on the rack 500. Further, the processor 700 may process information obtained by the sensor 600 or an image and then control the display 400 to display the processed information or image. In the foregoing description, both the process and control are performed in one processor 700. However, this is merely an example, and a wine storage apparatus according to an alternative embodiment of the disclosure may include a separate controller in addition to the processor.

The wine storage apparatus 100 according to an embodiment of the disclosure may further include a touch panel 800. The touch panel 800 may be provided in the display 400. In this case, the processor 700 of the wine storage apparatus 100 may control the display 400 to display guide information about wine according to results of identifying whether the wine is put on the rack 500 corresponding to a predetermined position, based on a user's touch made on the predetermined position of the touch panel 800. In this regard, detailed descriptions will be made with reference to FIGS. 3 and 4.

Figure 3:
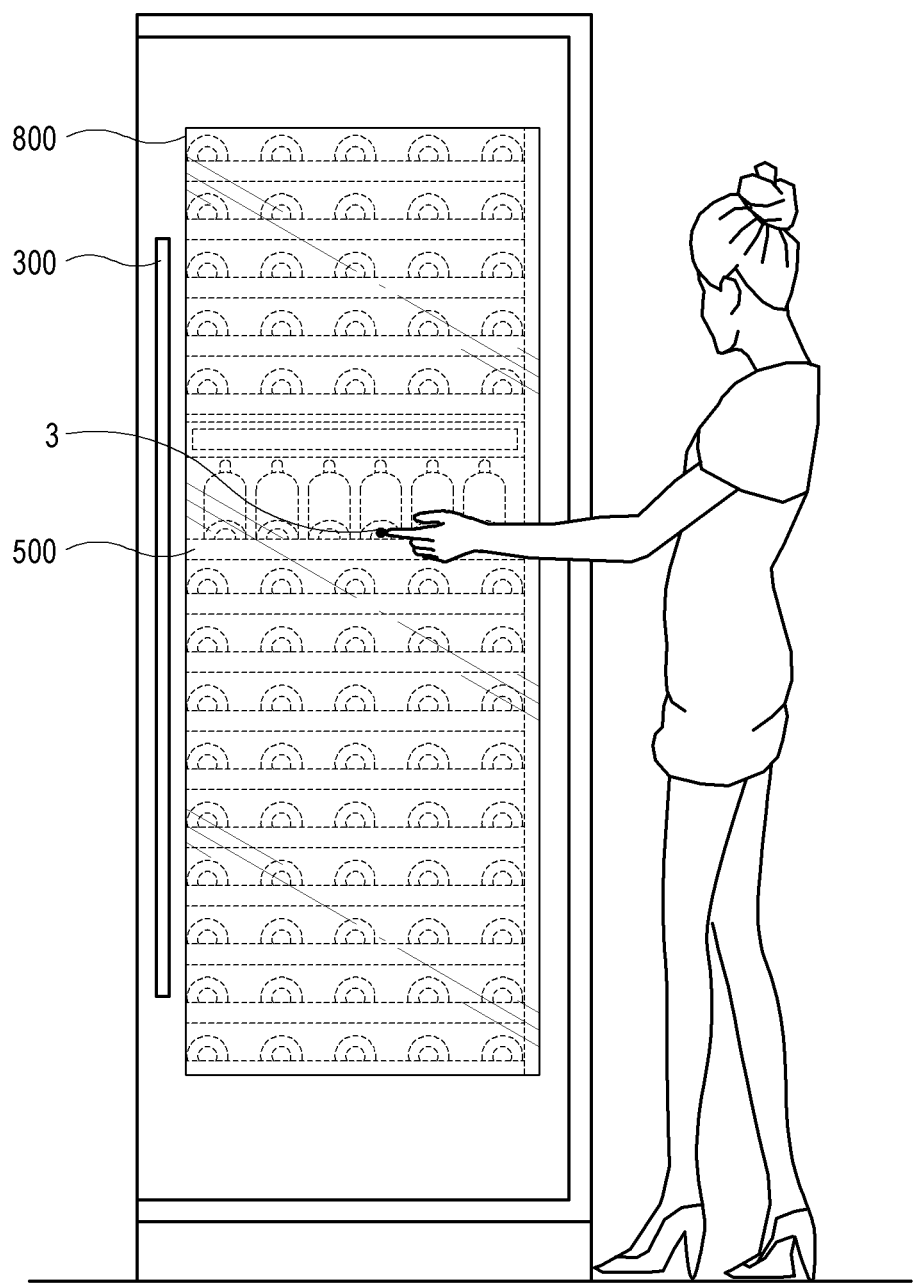
FIG. 3 illustrates an example of using a wine storage apparatus according to an embodiment of the disclosure.

FIG. 3 illustrates an example of using a wine storage apparatus according to an embodiment of the disclosure.

Figure 4:
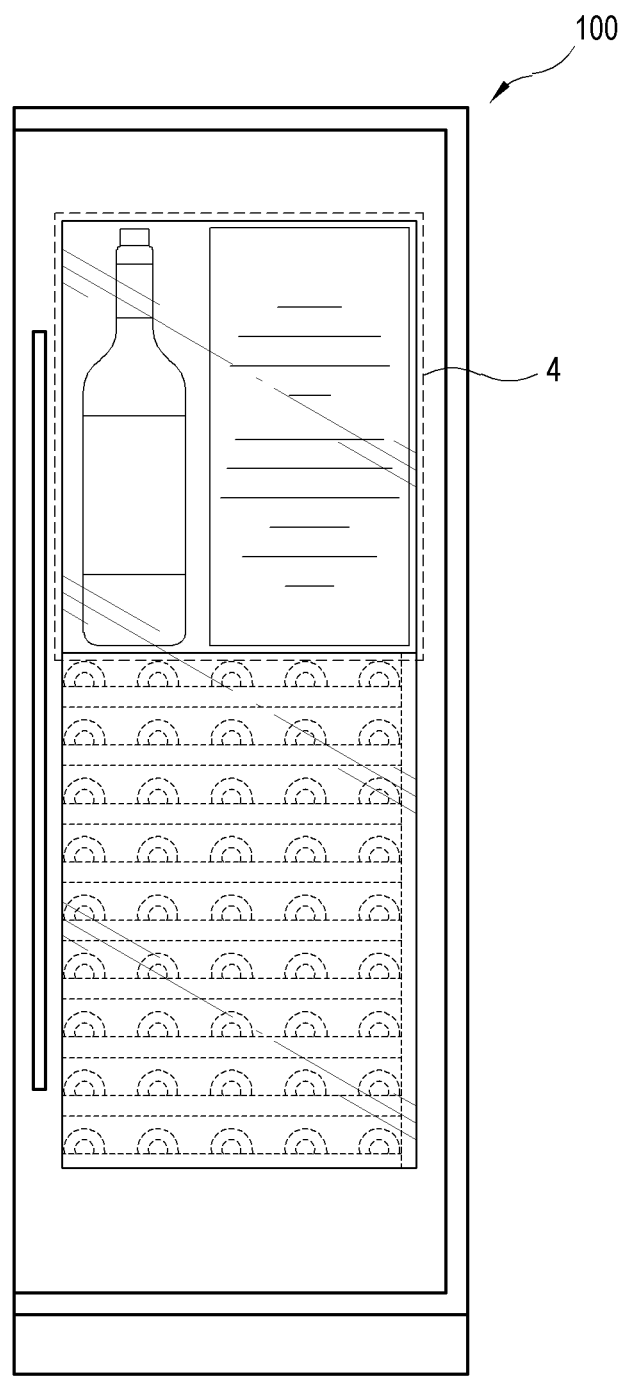
FIG. 4 illustrates an example of operating a wine storage apparatus according to an embodiment of the disclosure.

FIG. 4 illustrates an example of operating a wine storage apparatus according to an embodiment of the disclosure.

Referring to FIGS. 3 and 4, an example illustrates the display 400 is provided on the door 300 made of a transparent material, and an embodiment that the display 400 includes the touch panel 800 for detecting a user's touch input. When a user touches a predetermined position 3 of the touch panel 800 in the wine storage apparatus 100 according to this embodiment as shown in FIG. 3, the processor 700 may control the display 400 to display guide information 4 of a bottle of wine put on the rack 500 matching the touched position 3 as shown in FIG. 4. The matching between the predetermined position 3 touched by a user and the bottle of wine placed on the rack 500 may be processed by the processor 700. For example, when a user touches a predetermined position 3 on the touch panel 800, the processor 700 identifies a position of the rack 500 matching the touched position 3 and identifies a bottle of wine placed at the identified position, thereby processing the related guide information 4. Here, the guide information 4 of the wine may for example include an image of the wine, a name of the wine, a wine-producing area, a grape variety, a production year, a wine storage method, matching food, etc. However, the guide information of the wine is not limited to this example, but may include any information related to the wine.

When it is identified that a bottle of wine is not placed on the rack 500 corresponding to the touched predetermined position 3, the processor 700 may control the display 400 to display information or the like showing that any bottle of wine is not present. However, there are no limits to this embodiment. Alternatively, the processor 700 may control the display 400 to display information different in format or content from the information showing that any bottle of wine is not present, or display no information.

Thus, it is possible to check information about the wine stored in the wine storage apparatus 100 without opening the door 300 of the wine storage apparatus 100, thereby giving the wine information and minimizing the opening/closing of the door of the wine storage apparatus.

Below, the sensor 600 in the wine storage apparatus 100 according to an embodiment of the disclosure will be described in detail.

Figure 5:
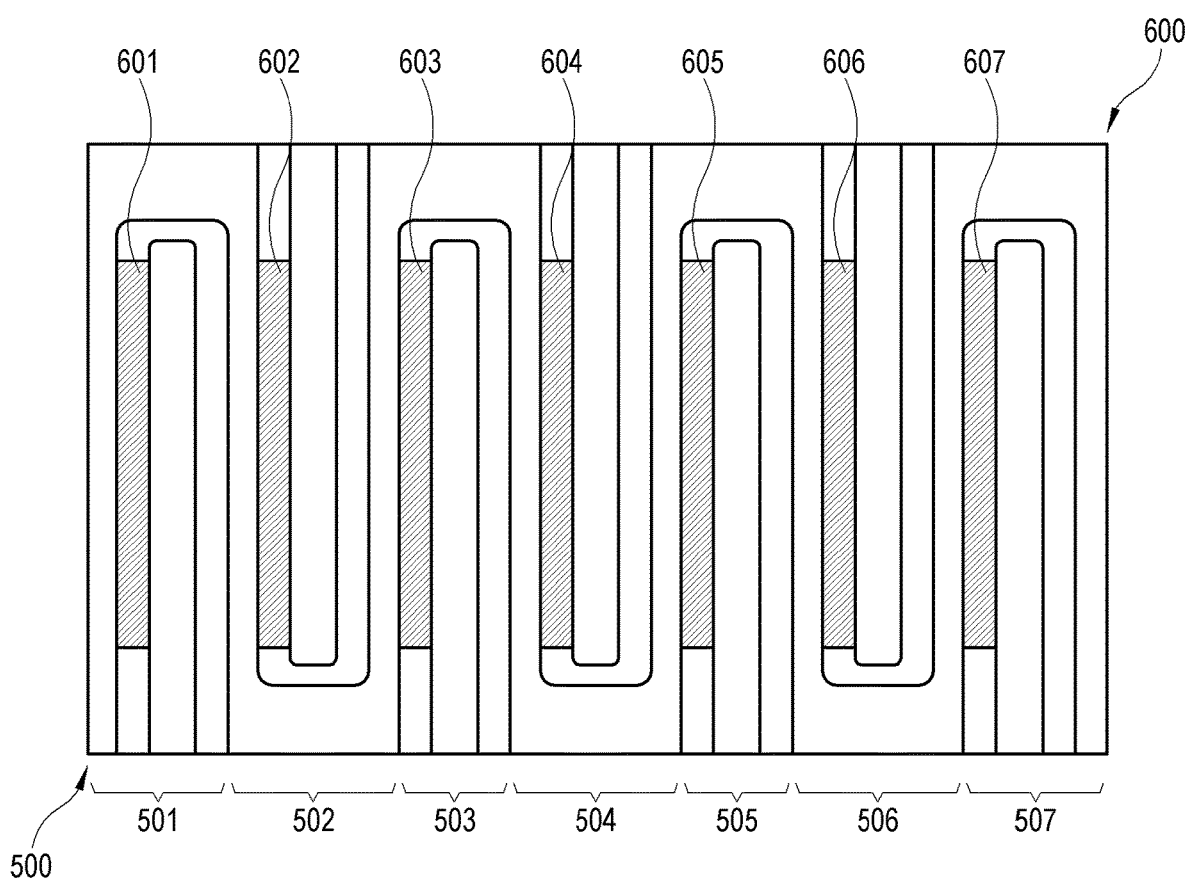
FIG. 5 illustrates an example of a rack and a sensor in a wine storage apparatus according to an embodiment of the disclosure.
Figure 6:
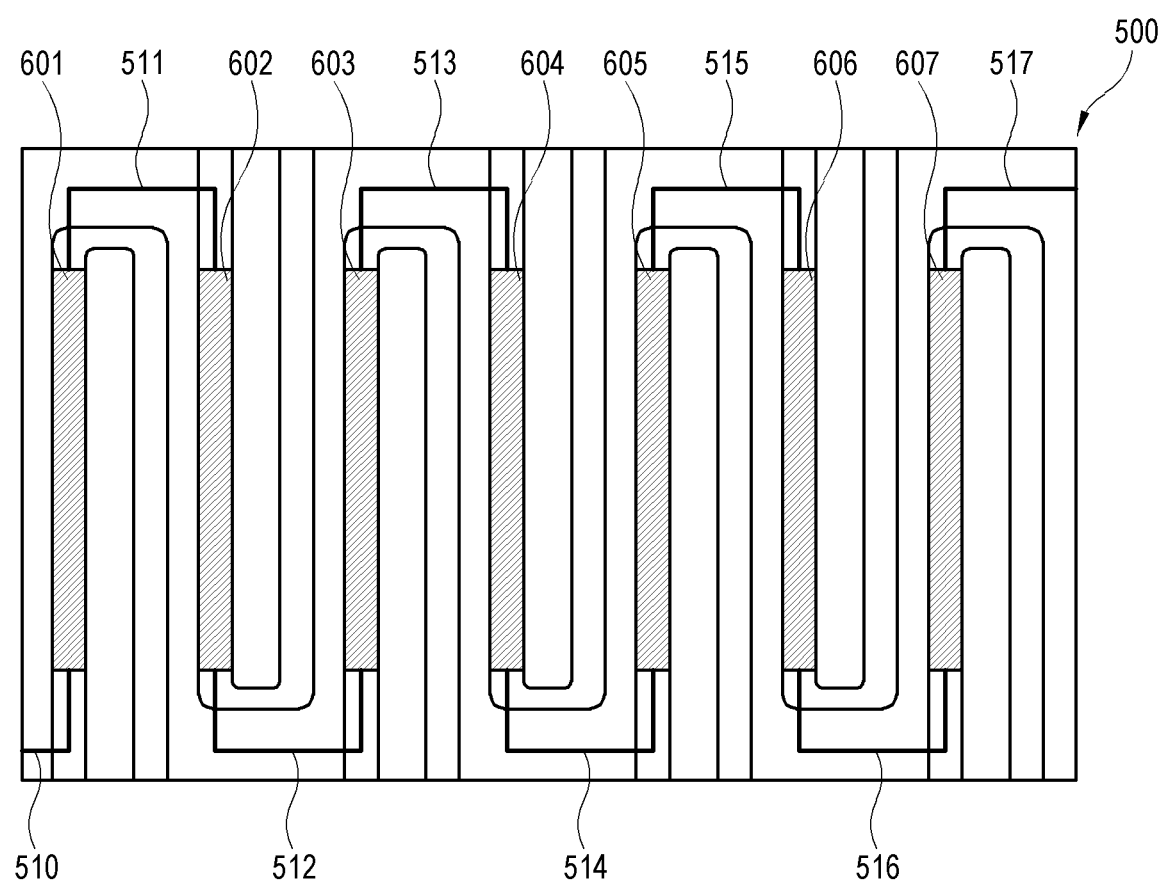
FIG. 6 illustrates another example of a rack and a sensor in a wine storage apparatus according to an embodiment of the disclosure.
Figure 7:
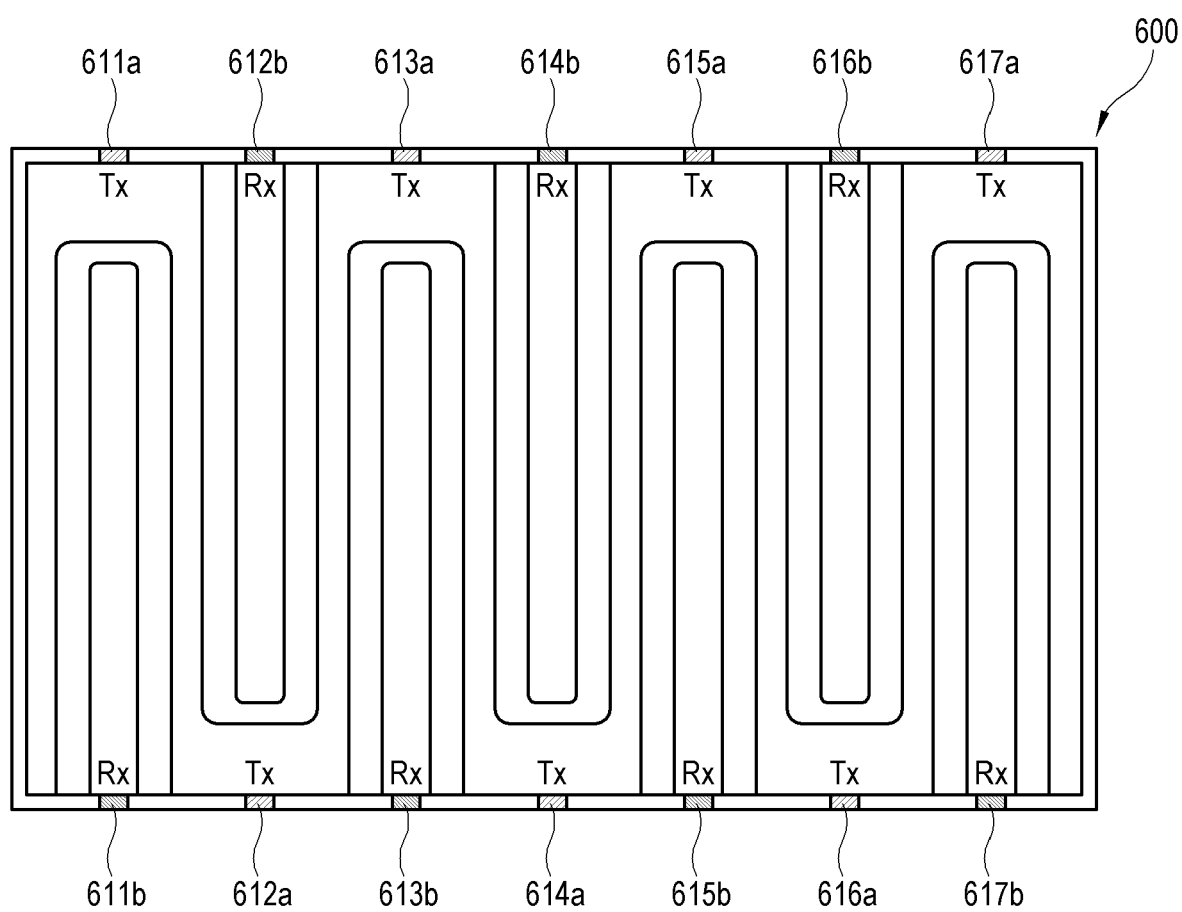
FIG. 7 illustrates still another example of a rack and a sensor in a wine storage apparatus according to an embodiment of the disclosure.
Figure 8:
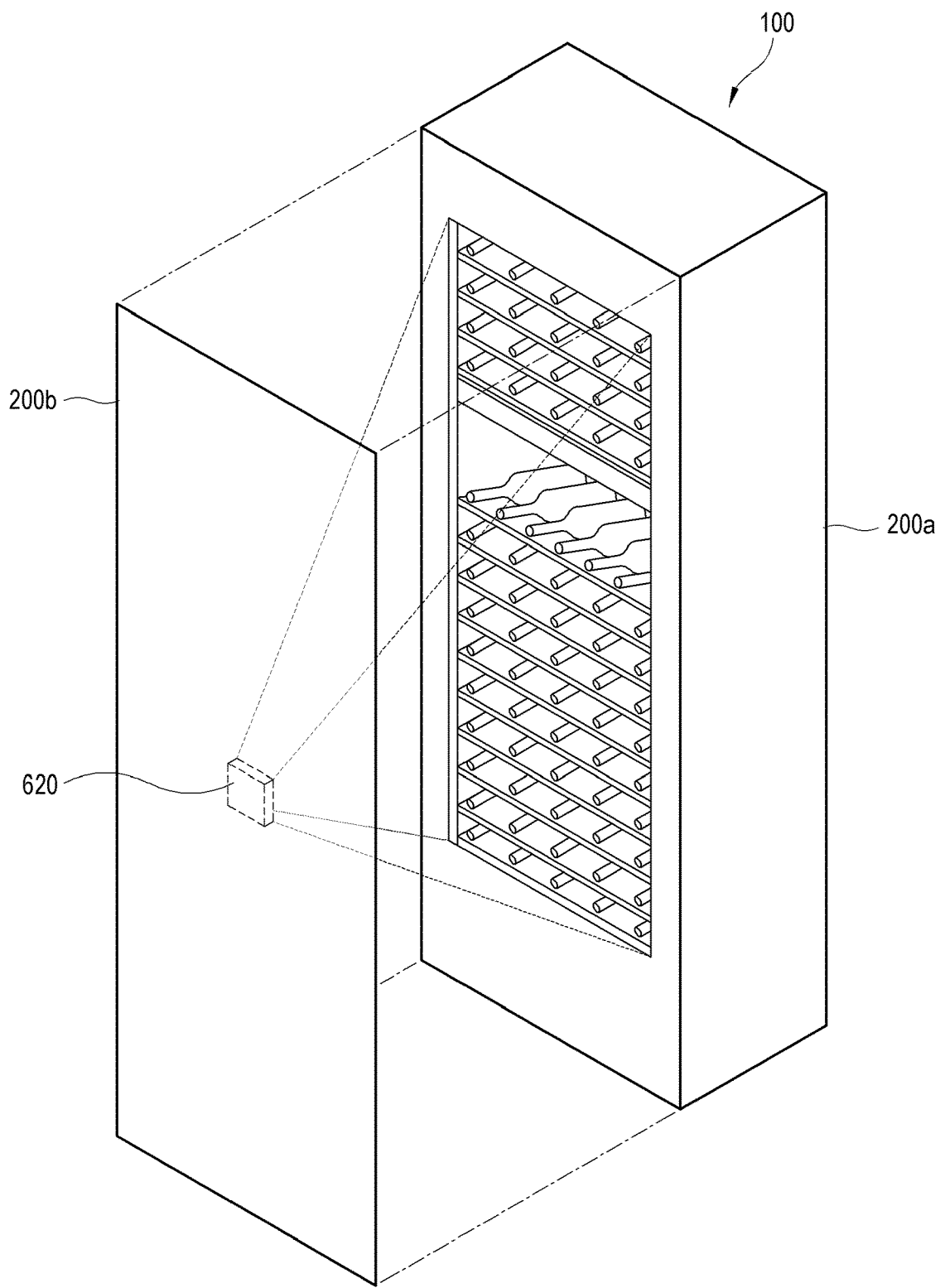
FIG. 8 illustrates yet another example of a rack and a sensor in a wine storage apparatus according to an embodiment of the disclosure.

The sensor 600 of the wine storage apparatus 100 according to an embodiment of the disclosure obtains information of whether a bottle of wine is placed on the rack 500. The sensor 600 of the wine storage apparatus 100 according to an embodiment of the disclosure may employ a pressure sensor, an optical sensor or an image sensor to obtain information of whether a bottle of wine is placed on the rack 500. In other words, the sensor 600 of the wine storage apparatus 100 according to an embodiment of the disclosure may, for example, be embodied by the pressure sensor, the optical sensor, or the image sensor. FIGS. 5 and 6 illustrate an embodiment that the sensor 600 comprises a pressure sensor, FIG. 7 illustrates an embodiment that the sensor 600 comprises an optical sensor, and FIG. 8 illustrates an embodiment that the sensor 600 comprises an image sensor.

The embodiment that the pressure sensor is used as the sensor 600 will be described with reference to FIGS. 5 and 6.

FIG. 5 illustrates an example of a rack and a sensor in a wine storage apparatus according to an embodiment of the disclosure;

Referring to FIG. 5, in the wine storage apparatus 100 according to an embodiment of the disclosure, one rack 500 may hold a plurality of bottles of wine. For example, the rack 500 may include a plurality of wine holders 501-507 for respectively holding a plurality of bottles of wine, as shown in FIG. 5. The wine holders 501-507 of FIG. 5 are provided to hold the bottles of wine, the mouths of which are alternately arranged toward opposite directions in relation to their adjacent holders 501-507. However, the disclosure is not limited to this embodiment. Alternatively, the bottles of wine placed on the wine holders 501-507 may be arranged to make their mouths face in the same direction.

When the sensor 600 comprises pressure sensor, the pressure sensor 600 may include a plurality of pressure sensors 601-607 respectively corresponding to the wine holders 501-507. That is, the wine holders 501-507 may be provided with the pressure sensors 601-607, respectively. In this case, each of the pressure sensors 601-607 detects change in pressure, thereby obtaining information about whether a bottle of wine is placed on the corresponding wine holder 501-507. The pressure sensors 601-607 may be embodied by any sensor capable of detecting pressure applied to the rack 500, and there are no limits to the kinds of sensor.

The processor 700 may identify whether a bottle of wine is placed on the rack 500, based on the information obtained by each of the pressure sensors 601-607. For example, when the pressure sensor 601 detects change in pressure, the processor 700 obtains information of the change in pressure detected by the pressure sensor 601, and thus identifies that a bottle of wine is placed on the corresponding wine holder 501. As an example of obtaining information about the change in pressure detected by a predetermined pressure sensor 601, the processor 700 may detect an event or receive a signal generated as the pressure sensor 601 detects the change in pressure, thereby obtaining the information of the change in pressure detected by the pressure sensor 601. However, this is merely an example, and the method of the processor 700 to obtain the information about the change in pressure detected by the pressure sensor 601 is not limited to this example.

Thus, it is possible to identify whether a bottle of wine is placed on each individual wine holder of the rack in the wine storage apparatus.

FIG. 6 illustrates another example of a rack 500 and a sensor 600 in a wine storage apparatus 100 according to an embodiment of the disclosure.

Referring to FIG. 6, as noted the foregoing embodiment described with reference to FIG. 5, each of the pressure sensors 601-607 may be individually connected to the processor 700. In this case, wiring lines are needed for the pressure sensors 601-607 respectively corresponding to the wine holders 501-507. However, a lot of wiring lines may make it difficult to conceal the wiring lines and may be unattractive. To reduce the number of necessary wiring lines, the rack 500 may include a wiring line for electrically connecting each of the plurality of sensors 601-607 respectively corresponding to the plurality of wine holders 501-507. For example, as shown in FIG. 6, the rack 500 may include wiring lines 511-516 for electrically connecting two adjacent sensors 601-607 among the plurality of sensors 601-607 respectively corresponding to the plurality of wine holders 501-507. Further, the rack 500 may additionally include a wiring line 510 or 517 connected to one end among the plurality of sensors 601-607, so that only the wiring line 510 or 517 can be directly connected to the processor 700. However, FIG. 6 merely shows an example to which this embodiment is not limited. Alternatively, as described above with reference to FIG. 5, when the wine holders 501-507 are provided to arrange the bottles of wine put thereon with their mouths facing in the same direction, the wiring line may be provided at a single side of the rack unlike the wiring lines of FIG. 6, which alternately arranged the bottles of wine at both sides of the rack 500. For example, the rack 500 may include a wiring line provided in the same direction as the lengthwise direction of the rack 500 at a single side of the rack 500 and branched from the wiring line directly connected to the processor 700. That is, the wine holders 501-507 may be connected by one common wiring line assigned to the whole rack 500 forming one plane. Alternatively, the wiring line may be provided in the form of a film, on which a circuit board structure for electrically connecting the plurality of sensors 601-607 corresponding to the wine holders 501-507 is printed, which is attached or adhered to the rack.

In such a case where the rack 500 has the above-described wiring line structure, when the sensor 601-607 detects a bottle of wine placed on the corresponding wine holder 501-507, the sensor 601-607 may transmit a detection signal, which includes detection information and identification information for identifying the sensor corresponding to the detection, to the processor to identify which of the sensors 601-607 obtains the information of whether a bottle of wine is present. For example, when the pressure sensor 601-607 detects pressure, each sensor 601-607 may transmit location information of the sensor and pressure detection information to the processor 700.

Thus, the rack 500 forming one plane is capable of communicating with the processor 700 through a single wiring line, and it is therefore possible to reduce the number of necessary electrical conductors, thereby improving design or appearance of the wine storage apparatus.

Meanwhile, the foregoing embodiments describe that wired communication is performed between the sensor 600 and the processor 700, but the disclosure is not limited to those embodiments. For example, the sensor 600 of the wine storage apparatus 100 according to an embodiment of the disclosure includes a wireless transceiver to exchange detection results and the like with the processor 700 through wireless communication.

When the wine storage apparatus includes wireless transceivers, it is possible to further improve the design or appearance of the wine storage apparatus.

Below, the sensor 600 including an optical sensor will be described with reference to FIG. 7.

FIG. 7 illustrates still another example of a rack and a sensor in a wine storage apparatus according to an embodiment of the disclosure.

Referring to FIG. 7, the sensor 600 may include a plurality of optical sensors 611-617 respectively corresponding to the wine holders 501-507. That is, the wine holders 501-507 may be provided with the optical sensors, respectively. As an example of the optical sensor, one optical sensor (e.g. 611) may include a light emitting sensor 611a and a light receiving sensor 611b. In this case, each of the optical sensors 611-617 can obtain information about whether a bottle of wine is placed on the corresponding wine 501-507 as light emitted from the light emitting sensors 611a-617a is detected by the light receiving sensors 611b-617b. As mentioned above with reference to FIG. 5, the wine holders 501-507 are provided to hold the bottles of wine, the mouths of which are alternately arranged toward opposite directions in relation to their adjacent holders 501-507. However, the disclosure is not limited to this embodiment. Alternatively, the bottles of wine put on the wine holders 501-507 may be arranged to orient their mouths face in the same direction. In this case, unlike FIG. 7 showing that the light emitting sensors 611a-617a and the light receiving sensors 611b-617b of the optical sensors 611-617 are alternately provided at one side of the rack 500, only the light emitting sensors 611a-617a are provided at one side of the rack 500 and only the light receiving sensors 611b-617b are provided at the other side of the rack 500.

Further, in terms of communication between the optical sensors 611-617 and the processor 700 and the wiring line for the communication, the optical sensors 611-617 may be individually connected to the processor 700 by wires similar to the foregoing embodiment of employing the pressure sensors 601-607. Besides, the optical sensors 611-617 may also be connected to the processor 700 by one common wiring line assigned to the whole rack 500 forming one plane by attaching or adhering a film, on which a circuit board structure is printed, to the rack or by wireless communication through which detection results are exchangeable between the processor 700 and the sensor 600 including the wireless communicator, etc.

Thus, it is possible to identify whether a bottle of wine is placed on each individual wine holder of the rack in the wine storage apparatus.

Below, the sensor 600 including an image sensor will be described with reference to FIG. 8.

FIG. 8 illustrates yet another example of a rack and a sensor in a wine storage apparatus according to an embodiment of the disclosure.

Referring to FIG. 8, the sensor 600 may include an image sensor 620 to capture an image of the rack 500 and a bottle of wine put on the rack 500. FIG. 8 illustrates an example that only one image sensor 620 is provided, but this embodiment is not limited to this example. As necessary, a plurality of image sensors 620 may be provided. For example, when a single image sensor 620 cannot capture images of all bottles of wine stored in the wine storage apparatus 100, the image sensor 620 may include a plurality of image sensors for capturing images of different locations, for example, two image sensors for respectively capturing images of an upper side and a lower side of the wine storage apparatus 100.

Further, FIG. 8 illustrates an example that the image sensor 620 is provided on a rear side 200b behind the wine storage apparatus 100 and captures an image in a direction toward the door 300 positioned on a front side 200a of the wine storage apparatus 100, but this embodiment is not limited to this example. That is, the image sensor 620 may be disposed at any suitable location as long as it can capture an image of a bottle of wine placed on the rack 500. For example, the image sensor 620 may be disposed on the front side 200a of the wine storage apparatus 100 and capture an image in a direction toward the rear side 200b. Below, for convenience, descriptions will be made on the assumption that one image sensor 620 positioned on the rear side 200b behind the wine storage apparatus 100 captures an image of a bottle of wine put on the rack 500.

The processor 700 obtains an image captured by the image sensor 620, applies an imaging process and an analysis technique to the obtained image, and identifies whether a bottle of wine is present on each wine holder 501-507 of the rack 500. In terms of identifying whether a bottle of wine is present based on the image captured by the image sensor 620, there are no limits to the imaging process and the analysis technique usable by the processor 700. For example, the processor 700 may for example employ machine learning or deep learning based on a support vector machine (SVM) algorithm or the like, in particular, a deep learning algorithm using a convolution neural network, etc. as a method of recognizing an object corresponding to a bottle of wine in an image. However, the method of recognizing the object is not limited to this method, but may employ various image recognition techniques. Further, as a method of identifying a location where an object corresponding to a bottle of wine is stored within the wine storage apparatus 100, the processor 700 may for example employ a method of using coordinates where the object identified as the bottle of wine is located on the image, or a method of giving a predetermined identification marker to a location of each wine holder 501-507 on the rack 500 and recognizing the given marker within the image captured by the image sensor 620 to thereby identify the matching wine holder and its location.

Thus, it is possible to identify whether a bottle of wine is put on each individual wine holder of the rack in the wine storage apparatus.

Below, it will be described that the wine storage apparatus 100 according to an embodiment of the disclosure identifies a remaining amount of stored wine or change in the remaining amount.

The wine storage apparatus 100 according to an embodiment of the disclosure can identify the remaining amount of the stored wine. For example, when the wine storage apparatus 100 according to an embodiment of the disclosure employs the pressure sensor as the sensor 600, the processor 700 may identify the weight of wine put on the rack 500 through the pressure sensor, and identify the remaining amount of the stored wine based on information about the identified weight.

Figure 9:
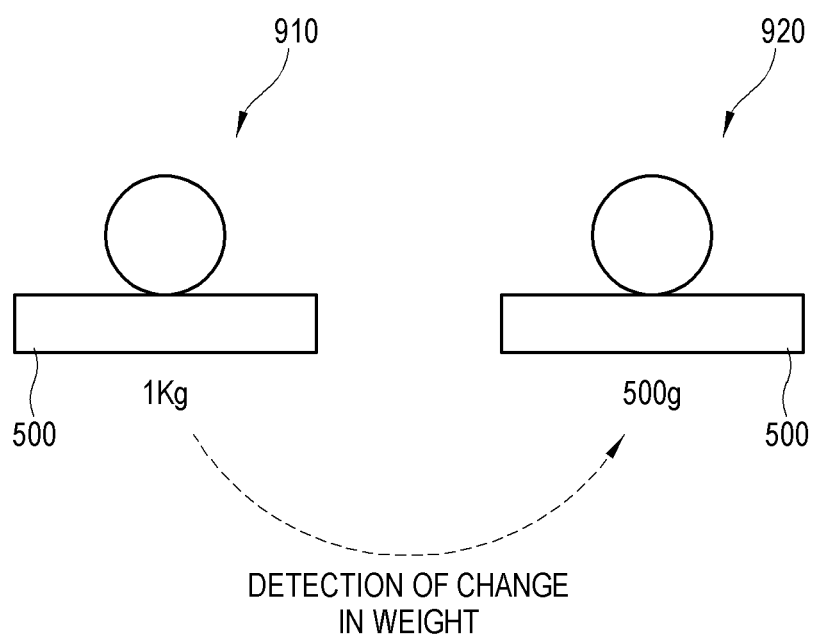
FIG. 9 illustrates an example of detecting change in a remaining amount of wine stored in a wine storage apparatus according to an embodiment of the disclosure.

FIG. 9 illustrates an example of detecting change in a remaining amount of wine stored in a wine storage apparatus according to an embodiment of the disclosure.

Referring to FIG. 9, the sensor 600 of the wine storage apparatus 100 includes the pressure sensor. When a bottle of wine is placed in one of the wine holders 501-507 of the rack 500, the pressure sensor 601 provided corresponding to the matching wine holder 501 detects change in pressure, thereby obtaining information of whether the bottle of wine is present on the wine holder 501. In this case, the pressure sensor 601 obtain information of whether the bottle of wine is present and also identify the weight of the wine based on a detected pressure level.

Further, the processor 700 may identify change in the remaining amount of the stored wine based on the identified weight information. For example, the processor 700 may identify the remaining amount of the stored wine, based ono the change in weight detected by the pressure sensor 601.

Specifically, when it is identified that a bottle of wine is present on a predetermined wine holder 501, the processor 700 stores the information about whether the bottle of wine is present on the wine holder 501 and weight information or a detection value of the pressure sensor 601 corresponding to the wine holder 501. For example, referring to reference numeral 910 of FIG. 9, the processor 700 identifies that the bottle of wine is placed on the wine holder 501 and also identifies that the bottle of wine put on the corresponding wine holder 501 has a weight of 1 Kg, through the pressure sensor 601, and then stores the identification results.

Thereafter, when a user takes the bottle of wine out of the wine holder 501, drinks some of the wine, and places the bottle of wine again on the wine holder 501, the pressure sensor 601 stores a detection value of the pressure sensor 601 or weight information at that time. For example, referring to reference numeral 920 of FIG. 9, the processor 700 identifies that the bottle of wine is taken out of and then put gain on the wine holder 501, and also identifies that the bottle of wine placed again on the wine holder 501 has a weight of 500 g, through the pressure sensor 601. By comparison between such identification results and the previously stored weight information or detection value of the pressure sensor 601, the processor 700 identifies that the bottle of stored wine is taken out and then newly stored, and identifies how much the bottle of newly stored wine is decreased in weight as compared with the bottle of previously stored wine and how much the wine remains in the bottle at the current time. For example, in the case of FIG. 9, the weight of the bottle of wine placed on the wine holder 501 is decreased in half from 1 Kg to 500 g, and thus the processor 700 identifies that half the total amount of initially stored wine remains.

After identifying the remaining amount of the stored wine as described above, the processor 700 may change guide information about the wine based on information of the identified remaining amount of the wine. Detailed descriptions of changing the guide information about the wine will be made later.

Meanwhile, the foregoing embodiment describes that the sensor 600 employs the pressure sensor to identify the remaining amount of the stored wine, but the disclosure is not limited to this embodiment. Alternatively, the wine storage apparatus 100 according to an embodiment of the disclosure may employ the image sensor 620 to identify the remaining amount of the stored wine or identify change in the remaining amount.

In a case where the wine storage apparatus 100 according to an embodiment of the disclosure employs the image sensor 620 as the sensor 600, when a bottle of wine is placed on one among the wine holders 501-507 of the rack 500, the image sensor 620 recognizes that an object corresponding to the bottle of wine is present on the wine holder 501 based on a captured image, thereby obtaining information about whether the bottle of wine is present on the wine holder 501. In this case, the image sensor 620 obtain information about whether the bottle of wine is present and also identify a liquid level in the bottle of stored wine. The processor 700 may identify the remaining amount of the stored wine based on the information of the liquid level in the bottle of stored wine.

Figure 10:
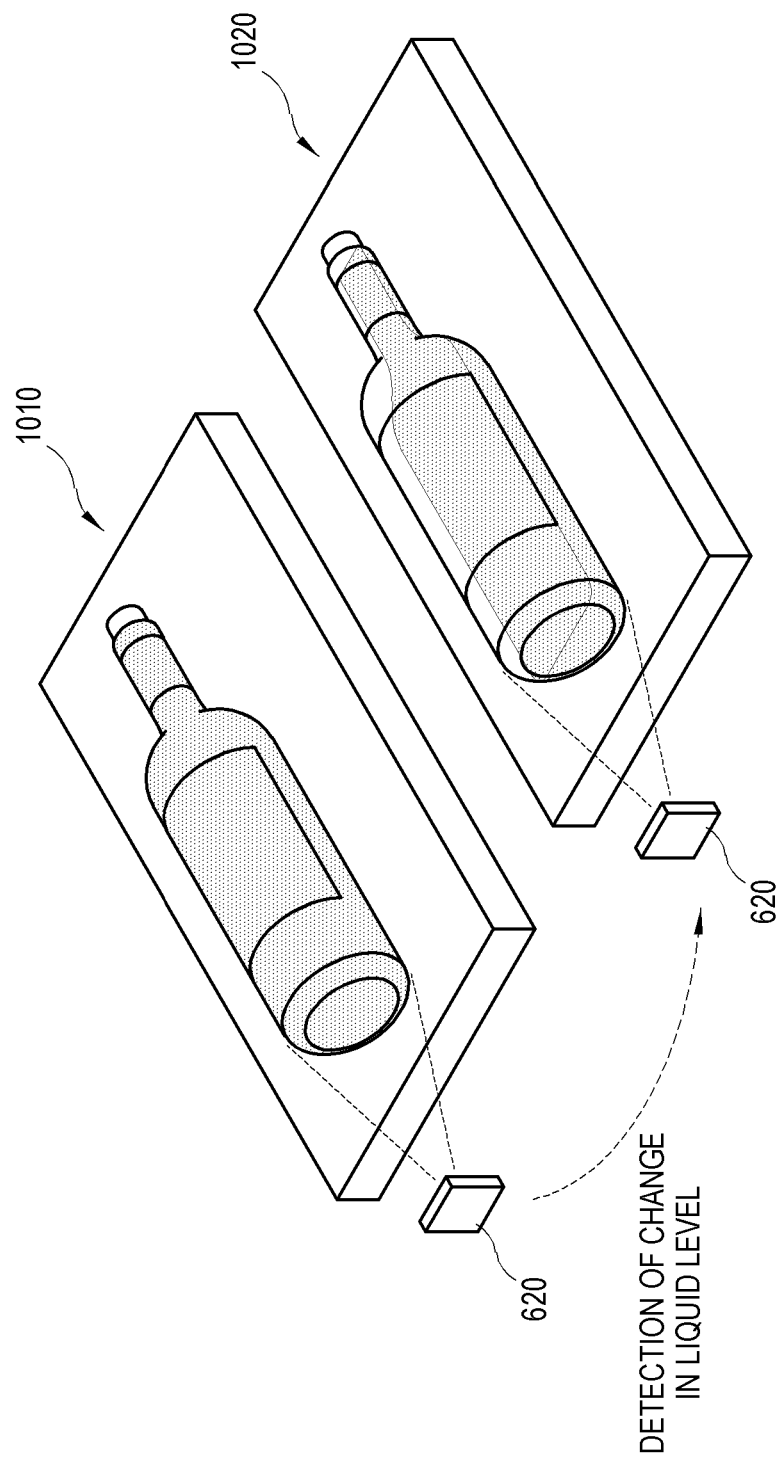
FIG. 10 illustrates another example of detecting change in a remaining amount of wine stored in a wine storage apparatus according to an embodiment of the disclosure.

FIG. 10 illustrates another example of detecting change in a remaining amount of wine stored in a wine storage apparatus according to an embodiment of the disclosure.

Referring to FIG. 10, the processor 700 may identify whether a bottle of wine stored once is taken out, opened and stored again and identify change in the remaining amount, based on change in the identified liquid level. Specifically, when it is identified that a bottle of wine is present on a predetermined wine holder 501, the processor 700 stores information of whether the bottle of wine is present on the wine holder 501 and information about a liquid level in the bottle of wine on the matching wine holder 501. For example, referring to reference numeral 1010 of FIG. 10, the processor 700 identifies that the bottle of wine is put on the wine holder 501 and that the liquid level in the bottle of wine placed on the corresponding wine holder 501 is the maximum level, and then stores the identification results. Thereafter, when a user takes the bottle of wine out of the wine holder 501, drinks at least some wine, and puts the bottle of wine again on the wine holder 501, the image sensor 620 stores information about the liquid level at that time. For example, referring to reference numeral 1020 of FIG. 10, the processor 700 identifies that the bottle of wine is taken out of, the bottle of wine is returned to the wine holder 501, and that the liquid level in the bottle of wine put again on the wine holder 501 is two thirds of the maximum level, through the image sensor 620, and stores the identification results. By comparison between such identification results and the previously stored information about the liquid level in the bottle of wine, the processor 700 may identify whether the bottle of wine stored once is taken out, opened, and stored again. Further, the processor 700 may identify how much the bottle of newly stored wine is decreased in the liquid level as compared with the bottle of previously stored wine and how much the wine remains in the bottle at the current time. For example, in the case of FIG. 10, the liquid level in the bottle of wine put again on the wine holder 501 is lowered to two thirds, and therefore the processor 700 identifies that the wine is reduced by one third of the total amount of initially stored wine.

After identifying the remaining amount of the stored wine as described above, the processor 700 may change guide information of the wine based on information about the identified remaining amount of the wine. Below, an embodiment of changing the guide information about the wine will be described with reference to FIG. 11.

Figure 11:
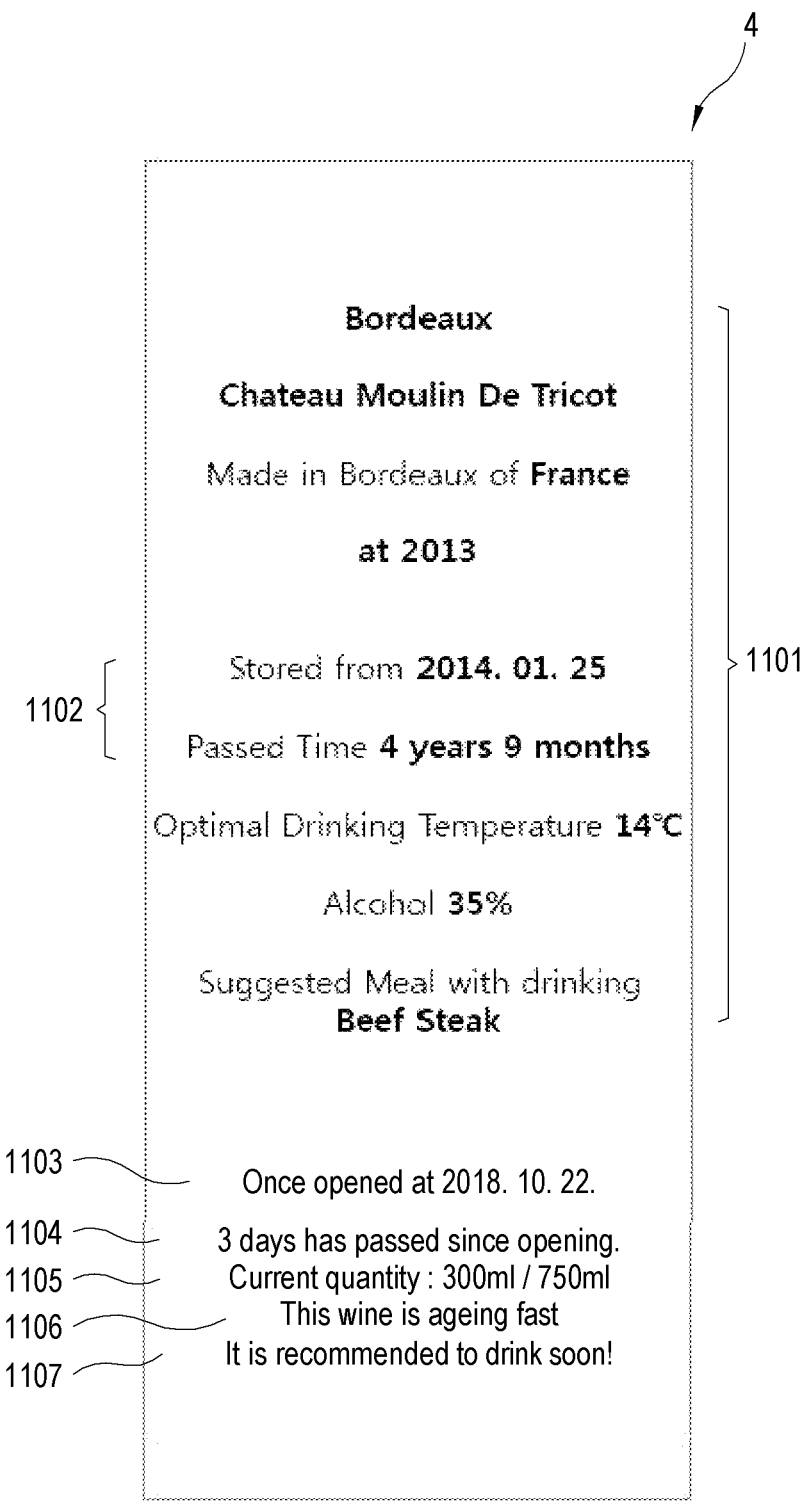
FIG. 11 illustrates an example of guide information displayed in a wine storage apparatus according to an embodiment of the disclosure.

FIG. 11 illustrates an example of guide information displayed in a wine storage apparatus according to an embodiment of the disclosure.

Referring to FIG. 11, an example illustrates guide information 4 of a bottle of wine placed on the rack 500 corresponding to a predetermined touched position 3 as information displayed on the display 400 by the processor 700 when a user touches the position 3 of the touch panel 800 in the wine storage apparatus 100 according to an embodiment of the disclosure.

Referring to FIG. 11, the guide information 1101 about the bottle of wine put on the rack 500 may for example include a name of the wine, a wine-producing area, a grape variety, a production year, a proper wine storage temperature, alcoholicity, matching food, etc.

Further, the processor 700 of the wine storage apparatus 100 according to the disclosure includes the sensor 600 for obtaining information about whether a bottle of wine is placed on the rack 500, and identifies whether the bottle of wine is placed on the rack 500 based on the information obtained by the sensor 600, thereby displaying the guide information on the display 400. For example, the processor 700 may display guide information 1102 of when the wine is stored in the wine storage apparatus 100, how much time has passed since then, etc. on the display 400.

As described above with reference to FIGS. 9 and 10, the processor 700 in the wine storage apparatus 100 according to an embodiment of the disclosure can identify whether the bottle of wine stored once is taken out of the wine storage apparatus 100 and then stored again after a user drinks at least some wine, based on information about the remaining amount of the wine or change in the remaining amount, thereby making the display 400 display the guide information based on the identification results. For example, referring to FIG. 11, the processor 700 may control the display 400 to display information 1103 about when a bottle of wine is opened and then stored gain in the wine storage apparatus 100 (1103), time information 1104 indicating how much time has passed since opening the wine, content information 1105 indicating how much wine remains, ageing information 1105 indicating wine ageing based on when the wine has the best flavor, when the bottle of wine is opened once, etc., whether a current pace or tempo of drinking the wine is proper as compared with an ageing process of the wine, etc. When it is identified that a user's pace of drinking the wine is slower than a proper pace, the processor 700 may control the display 400 to further display a guide message 1107 for recommending the user to drink the wine soon. On the other hand, when it is identified that a user's pace of drinking the wine is faster than the proper pace, the processor 700 may control the display 400 to further display a guide message for recommending the user to drink the wine later. Further, the processor 700 may display the content information 1105 indicating a remaining amount of the wine in units of weight such as gram, kilogram, etc. or in units of volume such as liter, milliliter, etc. as shown in FIG. 11.

Meanwhile, the foregoing information refers to information that can be provided when a bottle of wine stored at least once in the wine storage apparatus 100 is taken out of the wine storage apparatus 100 and then stored again. Therefore, the processor 700 may control the display 400 to display the above-described guide information in the form of being added to the existing guide information 1101 and 1102. Further, even after the foregoing information is displayed as added once, the foregoing information needs to be updated every time when a bottle of wine is taken out of the wine storage apparatus 100 and stored again. Therefore, the processor 700 may update the foregoing information whenever a bottle of stored wine is taken out of the wine storage apparatus 100 and then stored again. An updating method may be carried out by replacing the existing information with updated information, or continuously accumulating histories in addition to the existing information.

Thus, a user may be given additional information based on change in storage conditions for the wine.

Below, an example of identifying the wine itself as well as identifying whether a bottle of wine is stored in the wine storage apparatus 100 will be described.

Figure 12:
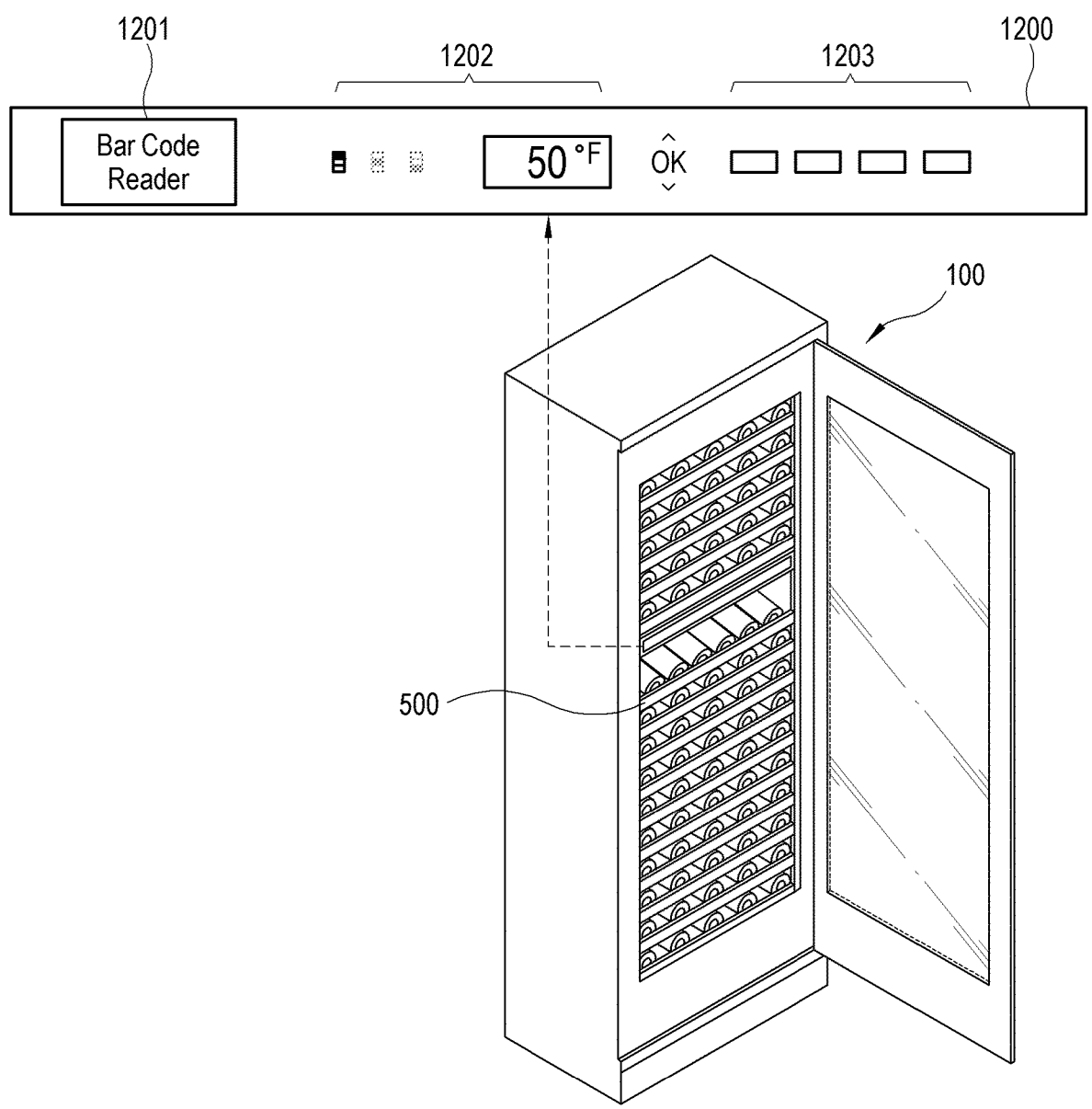
FIG. 12 illustrates an example of a wine identifying method of a wine storage apparatus according to an embodiment of the disclosure.

FIG. 12 illustrates an example of a wine identifying method of a wine storage apparatus according to an embodiment of the disclosure.

Referring to FIG. 12, an example of a wine identifying method of a wine storage apparatus according to an embodiment of the disclosure is illustrated. In this embodiment, the wine storage apparatus 100 may include a bar-code reader 1201. The bar-code reader 1201 may be provided inside the wine storage apparatus 100. The bar-code reader 1201 or an indicator 1200 including the bar-code reader 1201 may be provided between the plurality of racks 500. The bar-code reader 1201 or the indicator 1200 including the bar-code reader 1201 may be provided at height corresponding to a user's eye level. When the door 300 is provided as a transparent material, the wine identification of using the bar-code reader 1201 is possible even when the door 300 is shut. The indicator 1200 including the bar-code reader 1201 may further include an information indicator 1202 for showing information about at least one storage compartment of the wine storage apparatus, and an input portion 1203 for changing settings for the storage compartment.

When a user puts a predetermined barcode on a bottle of wine close to the bar-code reader 1201, the processor 700 of the wine storage apparatus 100 identifies the bottle of wine based on the information obtained by the bar-code reader 1201. Further, when it is detected that the bottle of wine is stored within a predetermined period of time after identifying the bottle of wine through the bar-code reader 1201, the processor 700 stores the identified bottle of the wine by matching the storage location. That is, the processor 700 may store information about the identified bottle of wine based on the information obtained by the bar-code reader 1201, as the information about the bottle of wine stored at a predetermined location, based on the identification that the bottle of wine is stored at the corresponding location of the rack 500 based on the information obtained by the sensor 600, within a predetermined period of time after identifying the bottle of wine through the bar-code reader 1201.

Thus, it is easy to identify a bottle of wine stored in the wine storage apparatus.

Figure 13:
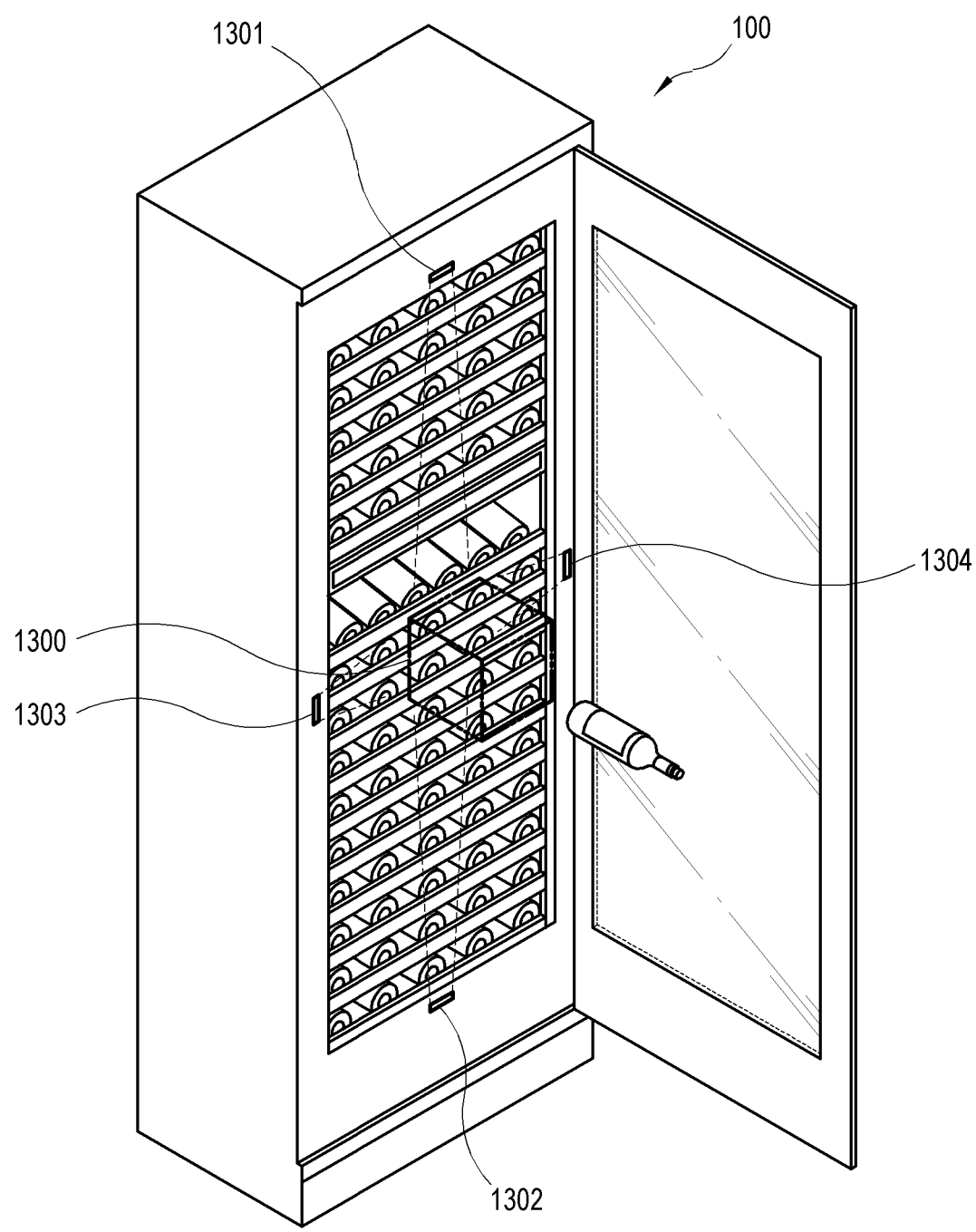
FIG. 13 illustrates another example of a wine identifying method of a wine storage apparatus according to an embodiment of the disclosure.

FIG. 13 illustrates another example of a wine identifying method of a wine storage apparatus according to an embodiment of the disclosure.

Figure 14:
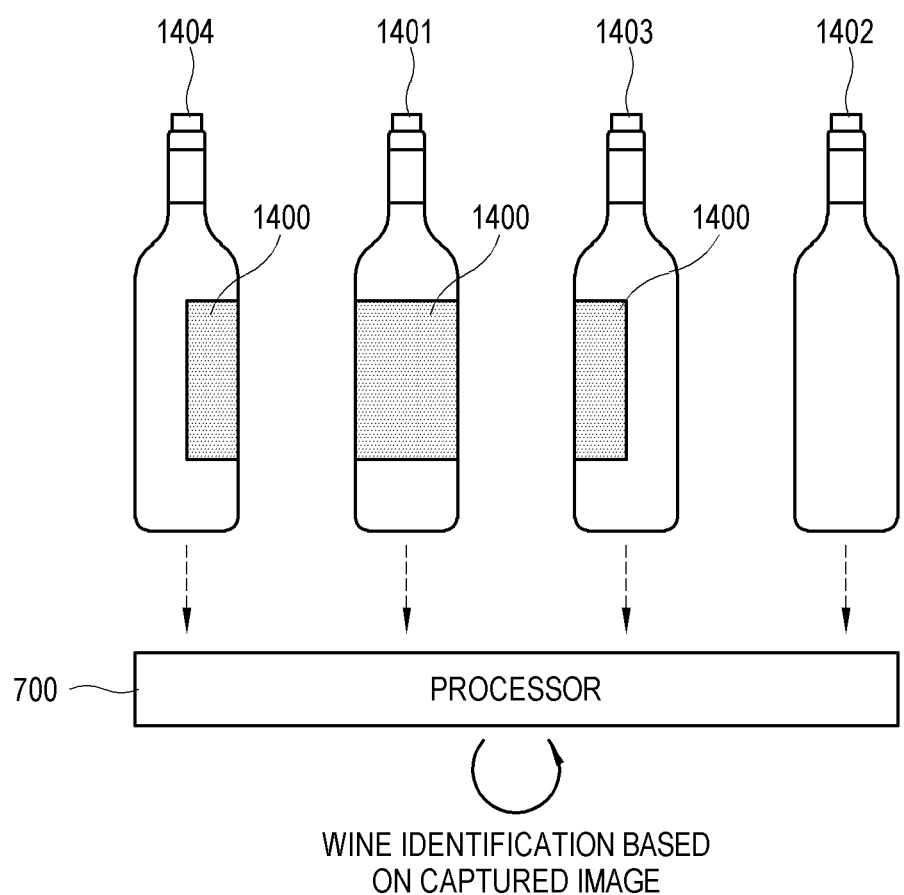
FIG. 14 illustrates still another example of a wine identifying method of a wine storage apparatus according to an embodiment of the disclosure.

FIG. 14 illustrates still another example of a wine identifying method of a wine storage apparatus according to an embodiment of the disclosure.

Referring to FIGS. 13 and 14, alternative examples of the wine identifying method in the wine storage apparatus according to an embodiment of the disclosure are illustrated. The processor 700 of the wine storage apparatus 100 in these embodiments can identify a bottle of wine based on a wine image captured by the image sensor.

The image sensor for identifying a bottle of wine may be provided at upper and lower sides and/or left and right sides of the housing 200 in the wine storage apparatus 100 the housing 200. However, this is merely an example, and there are no limits to the positions of the image sensors for identifying a bottle of wine. Further, the image sensor for identifying a bottle of wine may include not a plurality of image sensors but only one image sensor.

Referring to FIG. 13, an embodiment is illustrated that includes the image sensors for identifying a bottle of wine are provided at all of upper, lower, left and right sides of the housing 200, that is, an embodiment that the wine storage apparatus 100 includes an upper image sensor 1301, a lower image sensor 1302, a left image sensor 1303, and a right image sensor 1304.

In this embodiment, the processor 700 of the wine storage apparatus 100 may control the image sensors 1301-1304 to capture an image of a bottle of wine, based on detection of the bottle of wine moving toward the rack 500. For example, the processor 700 may control the image sensors 1301-1304 to capture an image of a bottle of wine, based on detection of the bottle of wine moving close to the wine storage apparatus 100. To detect whether the bottle of wine is close to the wine storage apparatus 100, the wine storage apparatus 100 may further include a proximity sensor, an infrared sensor, etc.

Thus, it is possible to automatically identify a bottle of wine while a user stores the bottle of wine in the wine storage apparatus.

Further, the processor 700 may control the image sensors 1301-1304 to capture an image of a bottle of wine, based on detection of whether a certain portion of the bottle of wine reaches a certain location of an entrance in the rack 500. For example, the processor 700 may control the image sensors 1301-1304 to capture an image of a bottle of wine, based on detection of whether a label on the bottle of wine is positioned at the center of an image capture area 1300 of at least one image sensor 1301-1304.

Thus, it is possible to automatically identify a bottle of wine while a user stores the bottle of wine in the wine storage apparatus.

An example of identifying a bottle of wine from an image captured by the image sensors 1301-1304 will be described with reference to FIG. 14.

When the image sensors for identifying a bottle of wine are disposed as shown in FIG. 13 by way of example, the processor 700 may identify the bottle of wine targeted for image capturing, based on images respectively captured by the upper image sensor 1301, the lower image sensor 1302, the left image sensor 1303, and the right image sensor 1304.

For example, when images 1401, 1402, 1403 and 1404 are respectively captured by the upper image sensor 1301, the lower image sensor 1302, the left image sensor 1303, and the right image sensor 1304, the processor 700 may identify a label 1400 on the bottle of wine targeted for image capturing based on the captured images, and may also identify the wine itself based on the identified label 1400. In this case, the processor 700 may use a database about the label 1400 on the bottle of wine and the wine corresponding to the label 1400, while identifying the bottle of wine. For example, the processor 700 may employ an artificial intelligence (AI) model, which learns from data of such a database, to identify the wine. However, the processor 700 need not to always use all the captured images to identify the label 1400 or the wine based on the label 1400. For example, when only one captured image is enough to identify the label 1400 or the wine, the processor 700 may employ only one captured image to identify the label 1400 or the wine. On the other hand, when a plurality of captured images is needed, the processor 700 may identify the wine based on an image where images captured by at least two of the image sensors 1301-1304, in particular, based on an image of the label 1400 obtained by combining the images captured by at least two of the image sensors 1301-1304.

Thus, it is possible to automatically identify a bottle of wine while a user stores the bottle of wine in the wine storage apparatus.

Meanwhile, to reduce electric power needed for driving the proximity sensor or the image sensors 1301-1304, the processor 700 in this embodiment may control the proximity sensor or the image sensors 1301-1304 to stand by in a sleep mode and control the proximity sensor or the image sensors 1301-1304 switch over to an operation mode only when there is a need of identifying whether a bottle of wine approaches or using the image sensor to capture an image. For example, FIG. 15 shows that the proximity sensor or the image sensors 1301-1304 switch over to the operation mode when the door 300 of the wine storage apparatus 100 is opened.

Figure 15:
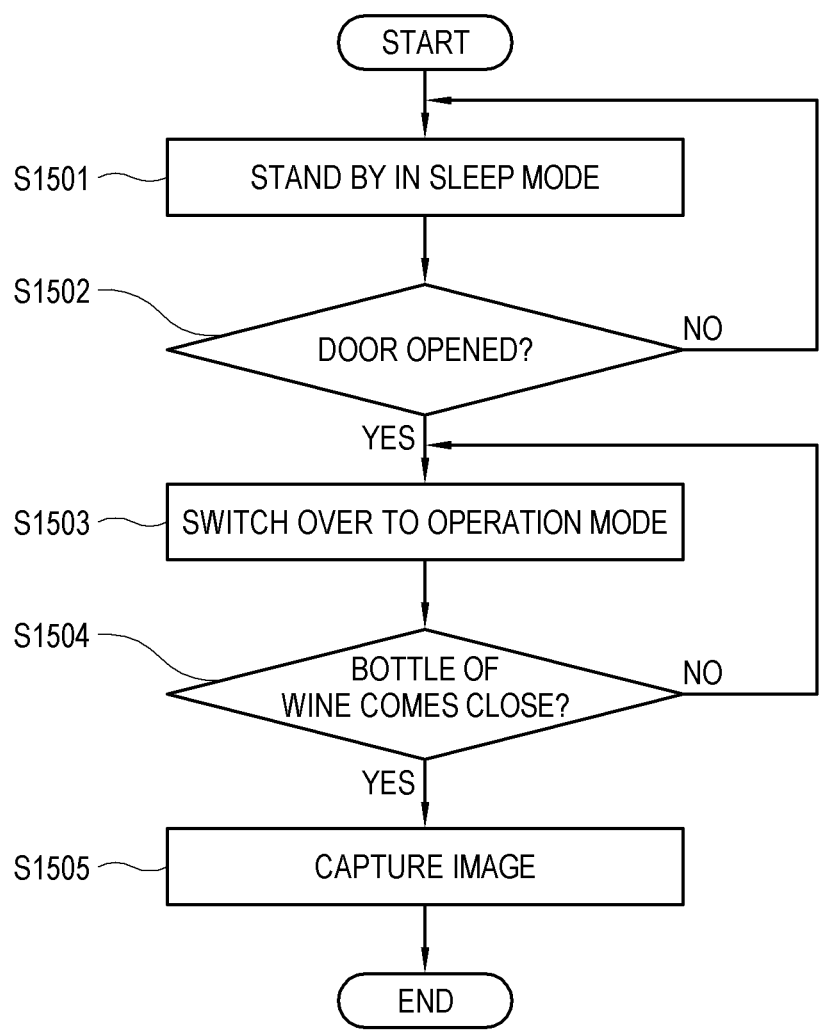
FIG. 15 illustrates yet another example of a wine identifying method of a wine storage apparatus according to an embodiment of the disclosure.

FIG. 15 illustrates yet another example of a wine identifying method of a wine storage apparatus according to an embodiment of the disclosure.

Referring to FIG. 15, the processor 700 of the wine storage apparatus 100 controls the proximity sensor or the image sensors 1301-1304 to stand by in the sleep mode in operation S1501. Then, the processor 700 detects whether the door 300 is opened in operation S1502. When it is detected that the door 300 is opened, the processor 700 controls the proximity sensor or the image sensors 1301-1304 to switch over to the operation mode in operation S1503. Thereafter, when the proximity sensor detects that a bottle of wine comes near the wine storage apparatus 100 in operation 51504, the processor 700 may control the image sensors 1301-1304 to capture images of the bottle of wine in operation S1505.

Thus, it is possible to reduce power consumed by the wine storage apparatus, in terms of providing a function of automatically identifying a bottle of wine the while a user stores the bottle of wine in the wine storage apparatus.

Meanwhile, according to at least one of the above-described embodiments, when a bottle of wine being stored in the wine storage apparatus 100 is automatically identifiable, it is possible to continuously trace a storage history of the wine such as a storage state, a storage period, change in a remaining amount, etc. even though the bottle of wine stored in the wine storage apparatus 100 is taken out, opened and used, and then stored again at a location different from the previous location. For example, although a bottle of wine A stored at a first location in the wine storage apparatus 100 is taken out, opened and used, and then the bottle of remaining wine A is stored again at a second location different from the first location in the wine storage apparatus 100, the processor 700 automatically identifies the bottle of wine A while the bottle of wine A is stored again. That is, even though the bottle of wine A is stored at the second location different from the first location, the processor 700 stores information about the bottle of wine A placed at the second location as the information about the bottle of wine A in addition to the information about the bottle of wine A previously placed at the first location. In other words, information about a bottle of wine stored in the wine storage apparatus 100 is stored with respect to the wine itself regardless of the storage locations, and therefore the wine guide information is continuously given to the same wind even though its storage location is changed.

Thus, propriety of providing the wine information is improved.

Figure 16:
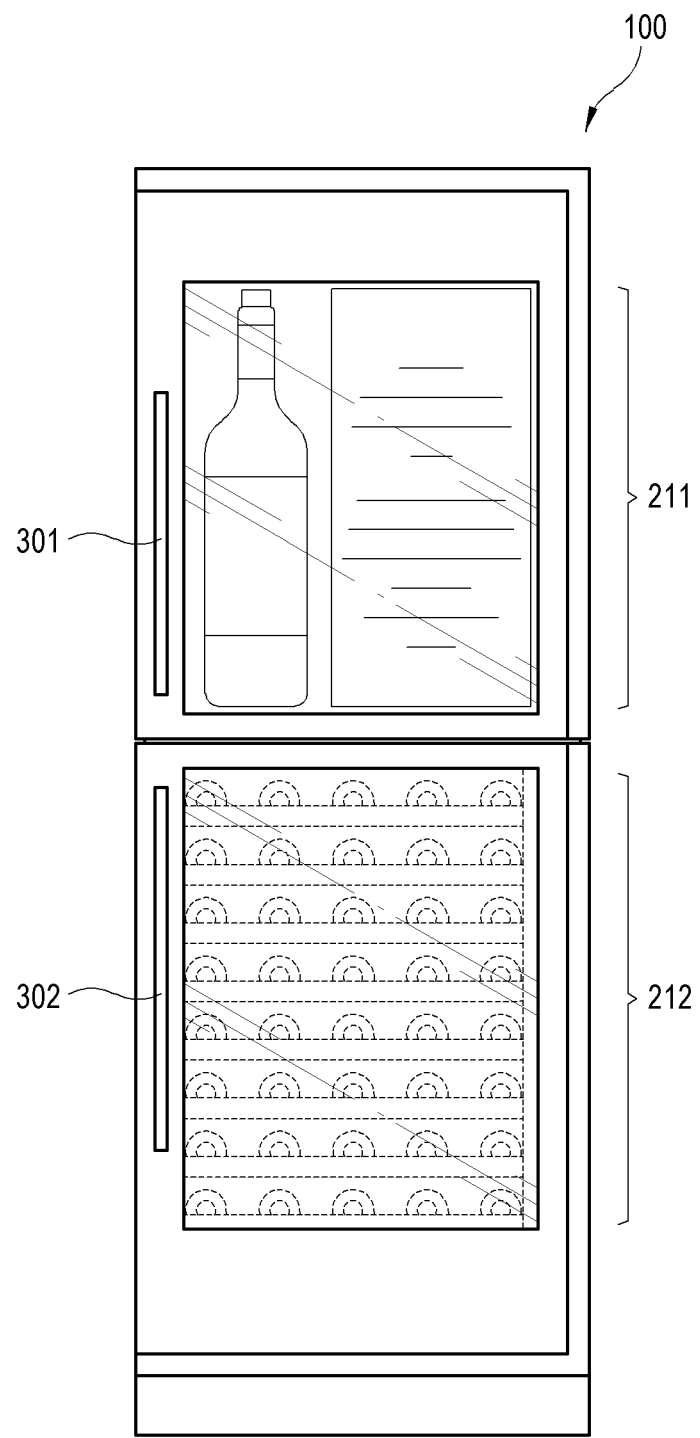
FIG. 16 is a front view of a wine storage apparatus according to another embodiment of the disclosure.

FIG. 16 is a front view of a wine storage apparatus according to another embodiment of the disclosure.

Referring to FIG. 16, the housing 200 of the wine storage apparatus 100 includes a first storage compartment 211 and a second storage compartment 212 which are isolated from each other. Further, the door 300 includes a first door 301 provided with the display 400 and opening/shutting the first storage compartment 211, and a second door 302 provided with the touch panel 800 and opening/shutting the second storage compartment 212. That is, according to this embodiment, the display 400 with the touch panel 800 is not provided throughout the whole door of the wine storage apparatus 100, but the door of the wine storage apparatus 100 is divided into doors respectively corresponding to two storage compartments. For example, the first door 301 for opening/shutting the first storage compartment 211 is provided with only the display 400, and the second door 302 for opening/shutting the second storage compartment 212 is provided with only the touch panel 800.

Thus, there are no needs of providing the display with the touch panel formed throughout the whole door, thereby reducing production costs of the wine storage apparatus.

As described above, according to the disclosure, there is provided a wine storage apparatus which gives wine information even with minimum opening/closing of a door.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wine storage apparatus comprising:
    a housing;
    a door configured to open and close the housing, the door including a display;
    a rack provided inside the housing and configured to hold a bottle of wine;
    a sensor configured to obtain information about whether a bottle of wine is stored on the rack; and
    a processor configured to:
        identify whether the bottle of wine is stored on the rack based on the information, and
        control the display to display guide information of the bottle of wine based on an identification result,
    wherein the sensor comprises a plurality of sensors for detecting a state of each of a plurality of wine holders provided in the rack, and
    wherein the rack comprises one of a wiring line alternately arranged at both sides of the rack to electrically connect two adjacent sensors among the plurality of sensors, a wiring line provided in the same direction as a lengthwise direction of the rack at a single side of the rack and branched from a common wiring line directly connected to the processor to be electrically connected with the plurality of sensors, or a wiring line provided on the rack in the form of a film on which a circuit board structure for electrically connecting the plurality of sensors is printed.

2. The wine storage apparatus of claim 1,
    wherein the display comprises a touch panel, and
    wherein the processor is further configured to:
        identify a touch at a predetermined position on the touch panel, and
        in response to identifying the touch, display the guide information.

3. The wine storage apparatus of claim 1, wherein the sensor comprises at least one of a pressure sensor, an optical sensor, or an image sensor.

4. The wine storage apparatus of claim 1, wherein the processor is further configured to:
    identify weight of the bottle of wine using a pressure sensor of the sensor, and
    identify a remaining amount of the bottle of wine based on the weight.

5. The wine storage apparatus of claim 1, wherein the processor is further configured to:
    identify a liquid level of in the bottle of wine using an image sensor of the sensor, and
    identify a remaining amount of wine in the bottle of wine based on the liquid level.

6. The wine storage apparatus of claim 5, wherein the processor is further configured to edit the guide information based on the remaining amount of wine.

7. The wine storage apparatus of claim 1,
    wherein the sensor comprises an image sensor, and
    wherein the processor is configured to:
    control the image sensor to capture an image of the bottle of wine, and
    identify the bottle of wine based on the image.

8. The wine storage apparatus of claim 7,
    wherein the image sensor is disposed at upper and lower sides or left and right sides in the housing, and
    wherein the processor is further configured to:
        identify the bottle of wine moving toward the rack, and
        in response to identifying the bottle of wine, control the image sensor to capture the image.

9. The wine storage apparatus of claim 8, wherein the processor is further configured to:
    identify that the door is opened, and
    in response to detecting identifying that the door is opened, switch the image sensor from a sleep mode over to an operation mode.

10. The wine storage apparatus of claim 1, wherein the sensor comprises a pressure sensor, the pressure sensor comprising a wireless transceiver.

11. The wine storage apparatus of claim 1,
    wherein the housing comprises a first storage compartment and a second storage compartment that are isolated from each other, and
    wherein the door comprises a first door comprising the display and configured to open and close the first storage compartment, and a second door comprising a touch panel and configured to open and close the second storage compartment.

12. The wine storage apparatus of claim 1, wherein the display is selectively transparent and exposes each bottle of wine stored in the rack.

13. The wine storage apparatus of claim 12, wherein the processor is further configured to:
    identify a touch on the display,
    in response to identifying a touch on the display, identify a location of the touch, and
    identify a bottle of wine in the rack based on the location.

14. The wine storage apparatus of claim 12,
    wherein the sensor comprises a barcode scanner disposed to read a barcode of the bottle of wine, and
    wherein the processor is further configured to:
        identify the barcode, and
        identify the guide information based on the barcode.

15. The wine storage apparatus of claim 12, wherein the processor is further configured to:

identify an amount of wine in the bottle of wine when placed onto the rack based on sensed information, and when the bottle of wine is returned to the rack, identify a remaining amount of wine based on sensed information.

16. The wine storage apparatus of claim 15, wherein the sensed information comprises one of a weight of the bottle of wine or a volume of air in the bottle of wine.

17. The wine storage apparatus of claim 15, wherein the processor is further configured to:

identify whether the bottle of wine should be consumed based on one of a vintage of the wine, a producer of the wine, a type of the wine, or the remaining amount of wine, and when the bottle of wine should be consumed, display an alert to indicate that the bottle of wine should be consumed.

18. A method for managing a wine storage apparatus including a sensor, a storage, a display and a processor, the method comprising:

in response to detecting, by the sensor, a bottle of wine is stored on a rack, controlling the processor to identify production information of the wine, store a time that the bottle of wine was stored and a location of the bottle of wine in the storage, and identify initial information of the bottle of wine;

in response to a touch input on a touch panel of a door of the wine storage apparatus, controlling the processor to identify a location of the touch input; and when the location of the touch input corresponds to the location of the bottle of wine, controlling the processor to display, on the display, production information of the bottle of wine, the time that the bottle was stored, and physical information related to the bottle of wine, wherein the sensor comprises a plurality of sensors for detecting a state of each of a plurality of wine holders provided in the rack, and wherein the rack comprises one of a wiring line alternately arranged at both sides of the rack to electrically connect two adjacent sensors among the plurality of sensors, a wiring line provided in the same direction as a lengthwise direction of the rack at a single side of the rack and branched from a common wiring line directly connected to the processor to be electrically connected with the plurality of sensors, or a wiring line provided on the rack in the form of a film on which a circuit board structure for electrically connecting the plurality of sensors is printed.

19. The method of claim 18, wherein the production information comprises one of a vineyard that produced the wine, a vintage, a grape varietal, a region of the vineyard, or a pairing recommendation.

* * * * *